No. 611,939. Patented Oct. 4, 1898.
J. H. REED.
MACHINE FOR MAKING BARREL HEADS.
(Application filed Aug. 3, 1897.)

(No Model.) 6 Sheets—Sheet 1.

Fig. 1.

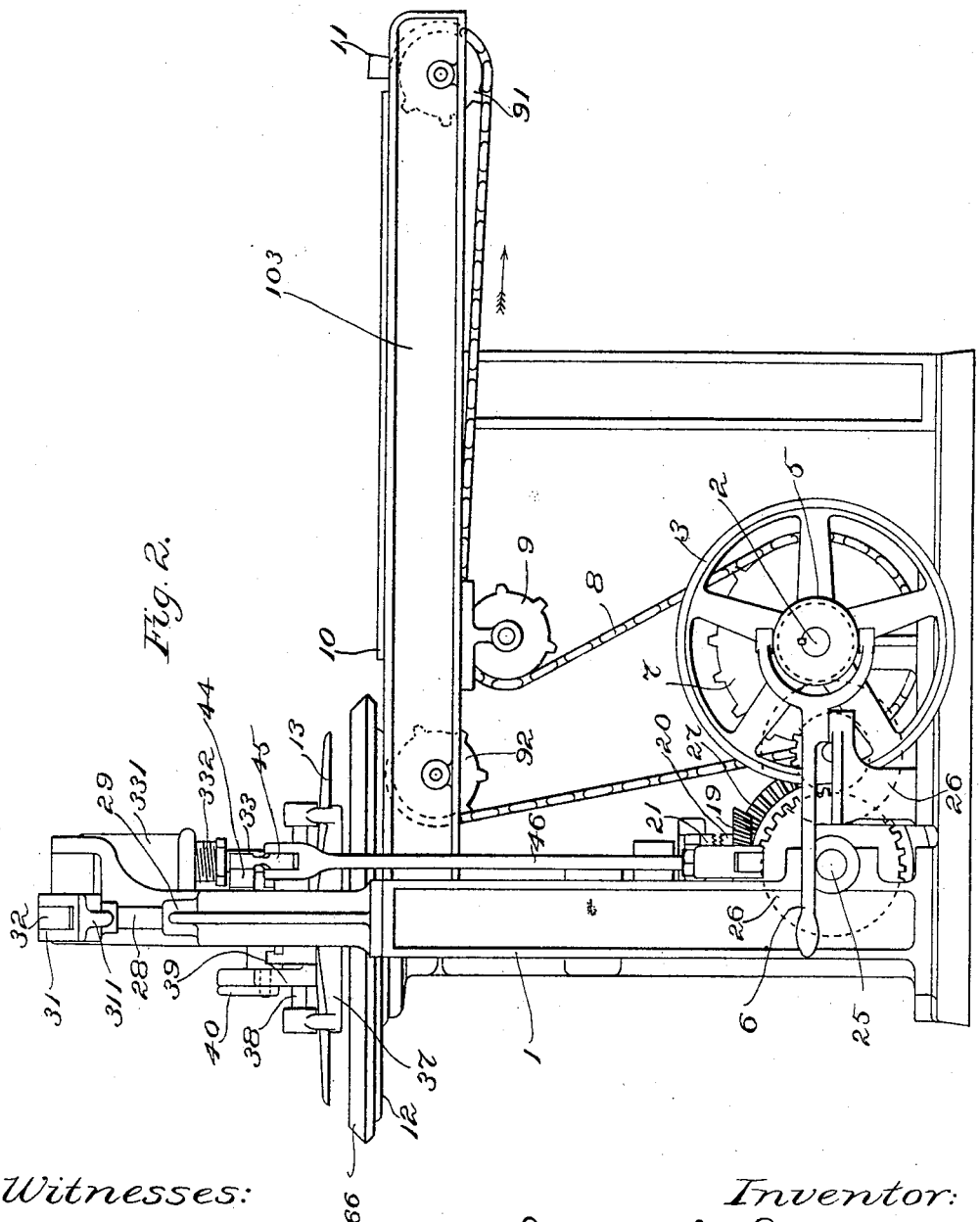

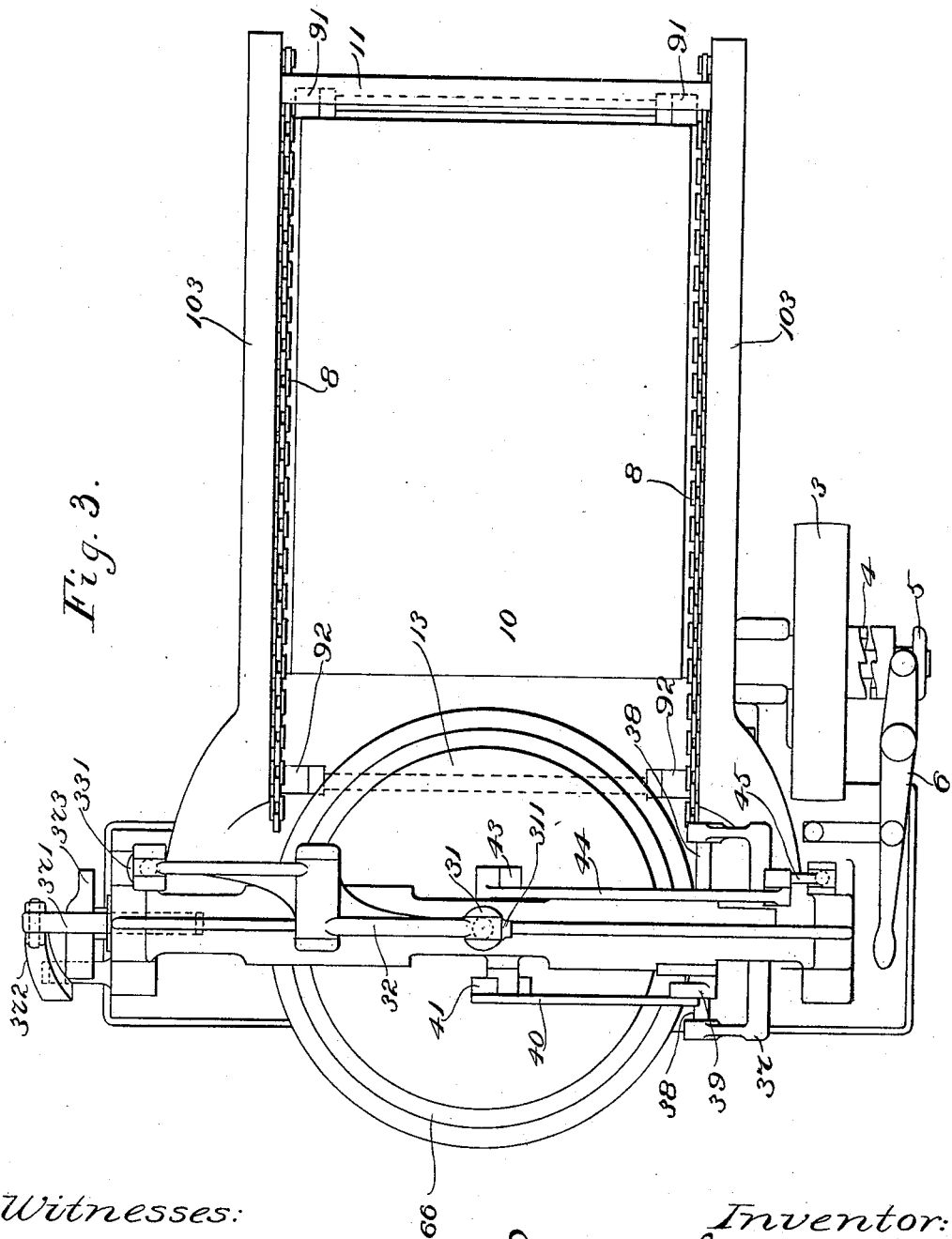

No. 611,939. Patented Oct. 4, 1898.
J. H. REED.
MACHINE FOR MAKING BARREL HEADS.
(Application filed Aug. 3, 1897.)
(No Model.) 6 Sheets—Sheet 4.
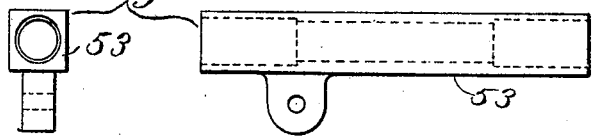
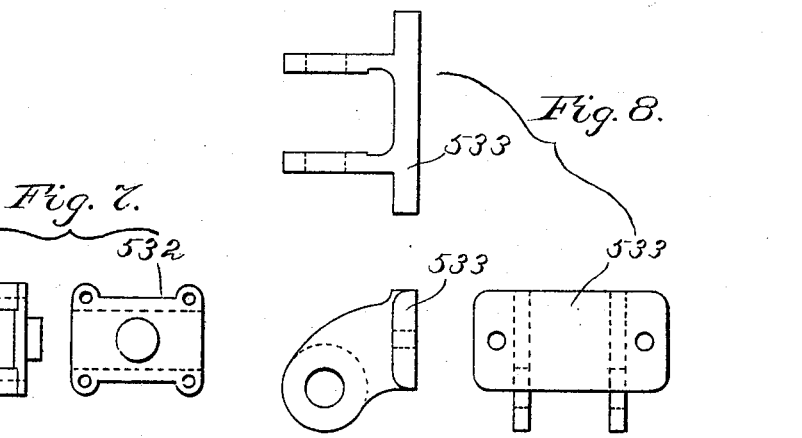
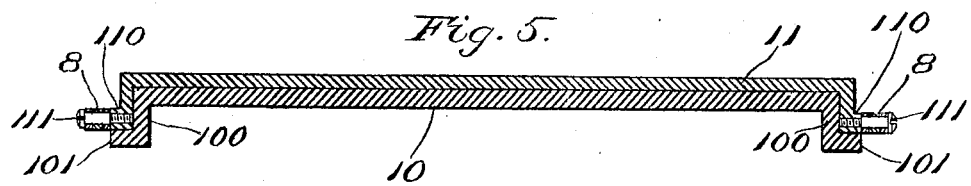
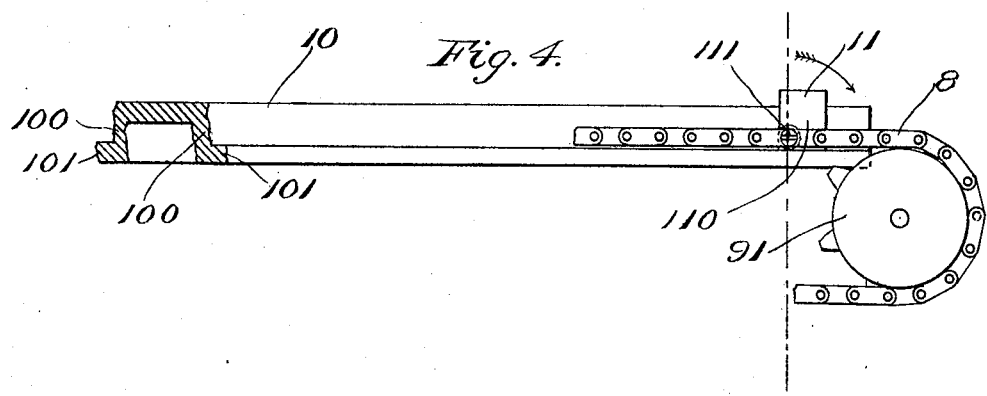
Witnesses:
Oscar F. Hill
Edith J. Anderson
Inventor:
James H. Reed
by Macleod Calvert & Randall
Attorneys

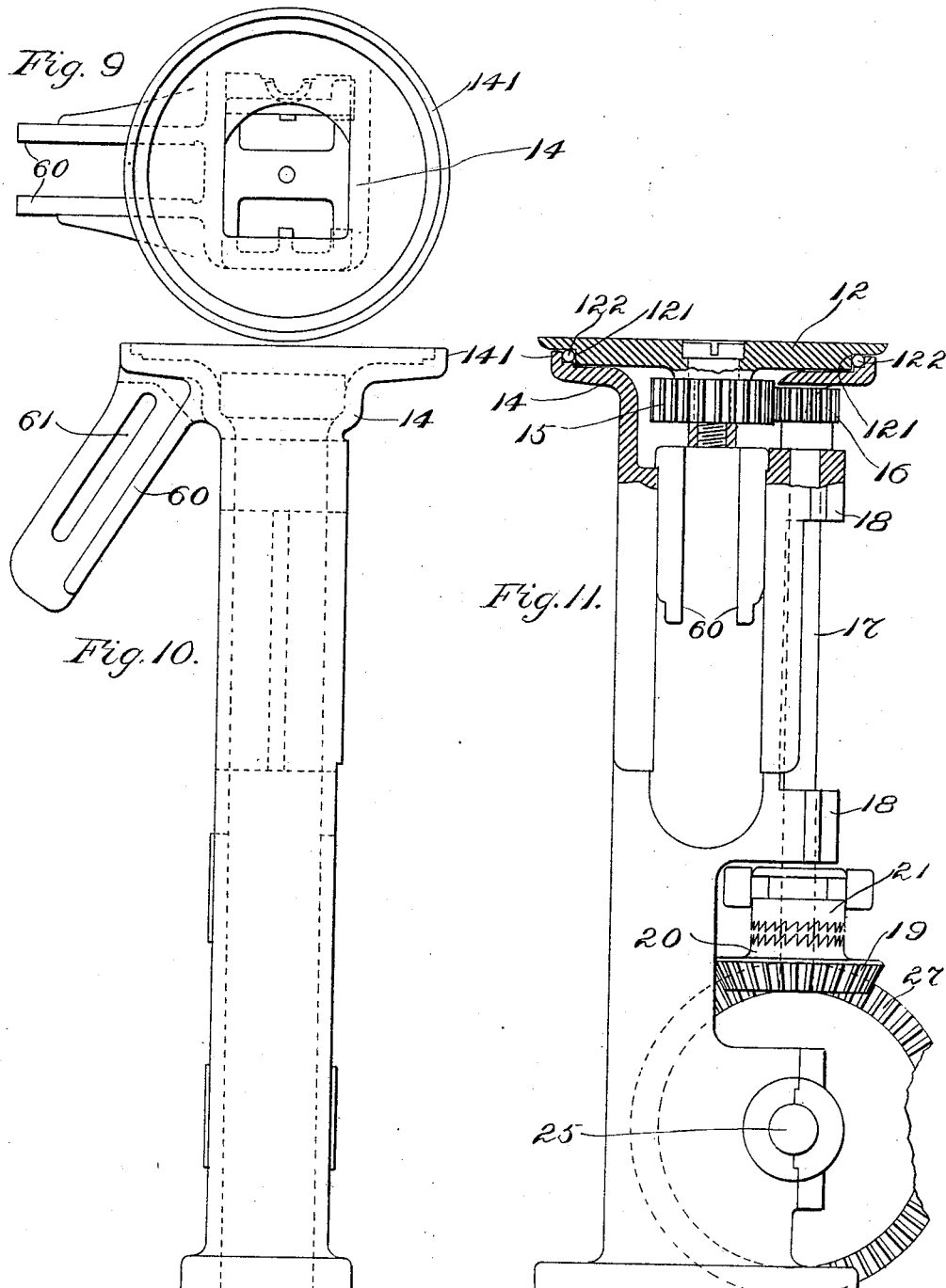

No. 611,939. Patented Oct. 4, 1898.
J. H. REED.
MACHINE FOR MAKING BARREL HEADS.
(Application filed Aug. 3, 1897.)
(No Model.) 6 Sheets—Sheet 6.
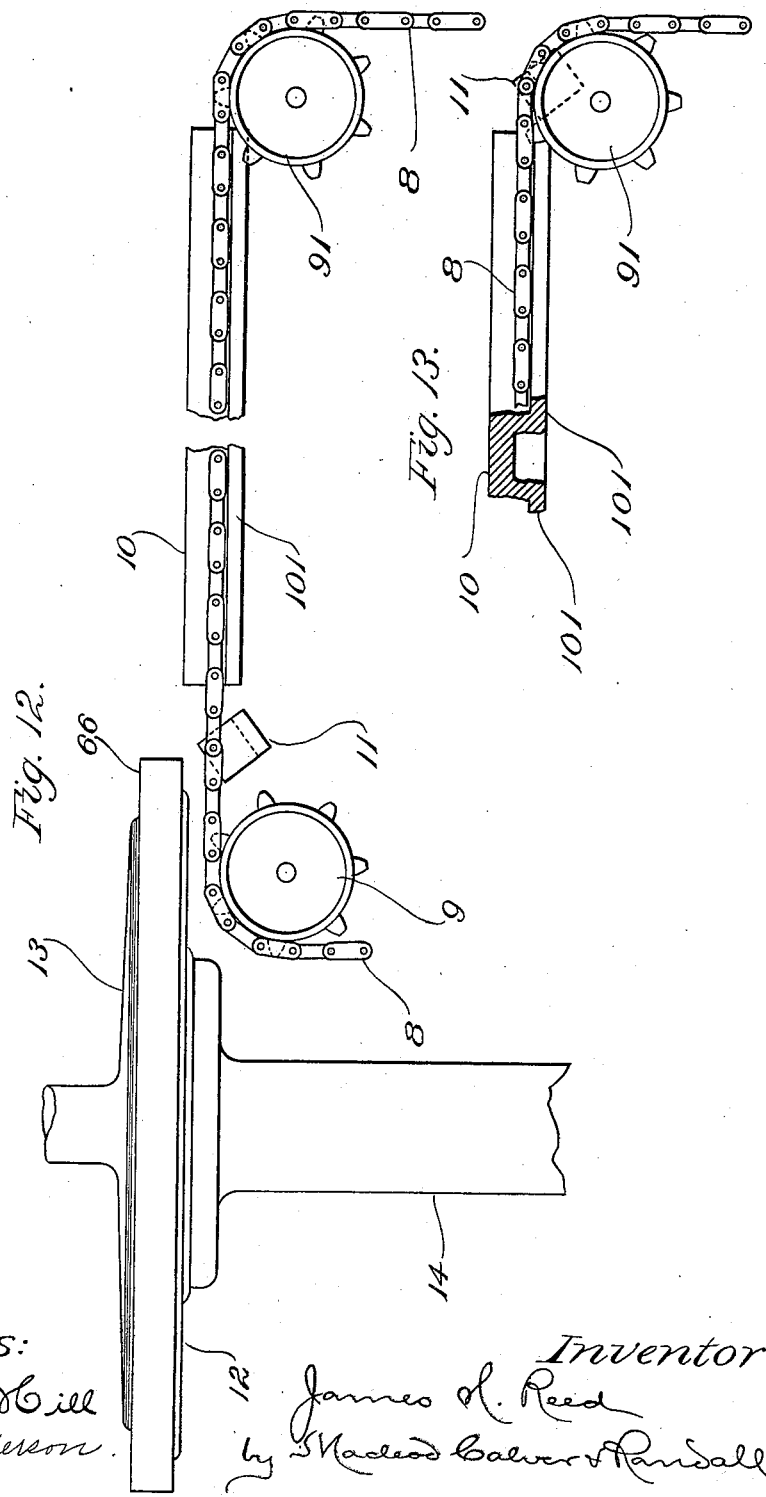
Witnesses:
Oscar F. Hill
Edith J. Anderson.
Inventor
James H. Reed
by Macleod Calver & Randall
Attorneys.

UNITED STATES PATENT OFFICE.

JAMES H. REED, OF LYNN, MASSACHUSETTS.

MACHINE FOR MAKING BARREL-HEADS.

SPECIFICATION forming part of Letters Patent No. 611,939, dated October 4, 1898.

Application filed August 3, 1897. Serial No. 646,927. (No model.)

*To all whom it may concern:*

Be it known that I, JAMES H. REED, a citizen of the United States, residing at Lynn, in the county of Essex and State of Massachusetts, have invented certain new and useful Improvements in Machines for Making Barrel-Heads, of which the following is a specification, reference being had therein to the accompanying drawings.

The invention will be described first with reference to the accompanying drawings, in which latter I have illustrated the best form in which I have thus far embodied the same, and afterward the distinguishing characteristics of the invention will be particularly pointed out and distinctly defined in the claims at the close of this specification.

Figure 1 of the drawings is a view in front elevation, partly in section, of a machine embodying the invention. Fig. 2 is a view thereof in side elevation, looking from the right-hand side in Fig. 1. Fig. 3 is a view thereof in plan. Fig. 4 is a view looking from the right-hand side in Figs. 1 and 3 of a portion of the feed-table, a portion of one of the sprocket-chains, one of its sprocket-wheels, and the feed-bar. Fig. 5 is a view in vertical transverse section on the dotted line of Fig. 4. Fig. 6 shows in end and side elevation the elongated sleeve-like frame 53, which is described hereinafter. Fig. 7 shows views in end and side elevation of the box 532, which is described hereinafter. Fig. 8 shows in plan, side elevation, and rear elevation the bracket to which the said box is journaled. Fig. 9 is a view in plan of the pillar 14, to which reference is made hereinafter; and Fig. 10 is a view thereof in elevation. Fig. 11 is a view, partly in elevation and partly in vertical section, of the said pillar and certain of the parts which are connected therewith. Figs. 12 and 13 are detail views of the feed table and bar, the former showing the bar dropped after having passed the end of the table.

1 designates the framing of the machine, and 2 the main or driving shaft, from which latter certain of the moving parts of the machine are operated.

3 designates a loose driving or band pulley which is mounted on the said shaft, it having the hub 4, which is shaped to constitute one half of a clutch, the other half of said clutch being designated 5 and being splined to the said shaft, so as to have capacity to move longitudinally thereof, 6 being the shipper handle or lever, which is provided for the purpose of enabling the clutch member 5 to be moved by the operator into and out of engagement with the clutch member 4 when required.

7 7 are sprocket-wheels which are made fast upon the shaft 2, near the opposite ends of the latter, and 8 8 are sprocket-chains extending parallel to each other adjacent to the opposite sides of the machine-framing and passing around the said sprocket-wheels 7 7 and actuated thereby, each of the said chains passing also around guiding sprocket-wheels 9 91 92. The sprocket-wheels 91 91 are located at the right-hand end of the machine in Figs. 2 and 3 at the right-hand end of a feed-table 10, while the sprocket-wheels 92 92 are located to the left of the left-hand end of the said feed-table, (see more particularly Fig. 2,) so that the sprocket-chains 8 8 in passing from the sprocket-wheels 91 91 to the sprocket-wheels 92 92 extend in a horizontal direction adjacent to the opposite side edges of the feed-table 10.

The sprocket-wheels 9 9 are located in convenient position adjacent to the forward end of the feed-table 10 and below the said feed-table, so as to guide the chains 8 8 upward from the sprocket-wheels 7 7 on the shaft 2. The feed-table 10 is formed along its opposite side edges with depending portions 100 100, the latter having horizontally-projecting flanges 101 101, constituting slideways on which the chains rest and slide, the said flanges resting on lugs 102 102, projecting inwardly from the side bars 103 103 of the machine-frame. The upper surfaces of the horizontal flanges 101 101 are somewhat below the upper surface of the feed-table, so that the chains in passing along the sides of the feed-table move below the upper surface thereof. To the chains 8 8 are pivoted the opposite ends of the feed-bar 11, preferably by means of the same rivets which hold certain of the links of the chains together. These rivets, as shown particularly in Figs. 4 and 5, engage with the depending portions or feet 110 110 at the ends of the said feed-bar and at the front lower corners of the said depending portions or feet 110 110, the bulk of the weight of the feed-bar being at the right-hand side of the rivets 111, so that the feed-bar tends to gravitate or turn on the said rivets in the direction which is indicated by the arrow in Fig. 4. In the working of the chains the feed-bar is carried around the sprocket-wheels 92 92, then around the sprocket-wheels 7 7, then around the sprocket-wheels 9 9, and then around the sprocket-wheels 91 91, and as it nears the right-hand end of the feed-table 10 (see Figs. 2 and 3) the front lower corners of the depending portions or feet 110 110 slide onto the right-hand ends of the horizontal flanges or slideways 101 101 of the feed-table. Thereby the feed-bar is swung into substantially a horizontal position parallel with the upper surface of the feed-table 10, and in the continued advancing movement of the chains 8 8, so long as the said depending portions or feet 110 110 are in contact with the said slideways 101 101, its intermediate portion is held upraised in position for engaging with the boards or pieces of material which have been laid side by side on the said feed-table and from which a barrel-head is to be produced. Hence in the advancing movement of the feed-bar it pushes the said boards or pieces ahead of it. The upper surface of the feed-table 10 is in substantially the same plane as the upper surface of the lower clamp 12, and the said table extends nearly to the clamps, leaving, however, a space at the right or feed side of the clamps between the latter and the proximate end of the feed-table for the dropping of the feed-bar 11. As it nears the left-hand or delivery end of the feed-table the feed-bar carries the assembled series of boards in front of it into position between the upper and lower clamps 12 13, by means of which latter the boards are held while being presented to the action of the cutters.

On arriving at the delivery end of the feed-table 10—that is to say, the left-hand end thereof in Figs. 2 and 3—the end portions 110 110 of the feed-bar pass off the ends of the slideways 101 101, and the feed-bar then gravitates or turns on the rivets 111 111 in the direction indicated by the arrow in Fig. 4, so that the engaging edge of the said feed-bar drops away from the boards, leaving them properly located between the clamps aforesaid. When the feed-bar drops on arriving at the forward end of the feed-table, it falls below the level of the feed-table and lower clamp, the remainder of the advancing movement of the feed-bar carrying it a short distance beneath the lower clamp, after which it is carried downward by the change in the course or direction of movement of the chains 8 8 where the latter pass around the sprocket-wheels 92 92.

During the working of the machine the motion of the feed-chains 8 8 is continuous and the said chains are so timed relatively to the other parts of the machine that the feed-bar 11 comes into position to engage a new set of boards at the completion of the cutting operation, which is performed upon the boards previously introduced between the clamps and held by the latter, the new set of boards in their advancing movement driving the just-shaped set out from between the clamps, which at this time are in an open condition.

12 is the lower clamp, (see Fig. 11,) on which the boards come to rest after having been fed forward by the action of the feed-bar 11, and 13 is the upper clamp, it coöperating with the clamp 12 to hold the boards firmly in place during the cutting operation.

The lower clamp 12 is located at the upper end of a vertical pillar 14, the latter having an upwardly-extending flange 141, within which fits the peripheral shoulder 121 of the clamp 12, the body of the said clamp resting on a series of antifriction-balls 122 122, which are held in place between the said flange 141 and the peripheral shoulder 121 on the clamp 12. The clamp 12 has applied to its under side a gear 15, which is engaged by a pinion 16 on the upper end of a vertical shaft 17, the latter being supported in bearings 18 on the side of the pillar 14. On the lower end of the said shaft 17 is mounted loosely a bevel-pinion 19, the hub of which latter is shaped to form one half of a clutch, while 21 is the other half of the clutch, it being splined on the said shaft, so as to enable it to move thereon toward and from the bevel-pinion 19.

For the purpose of moving the clutch member 21 into and out of engagement with the clutch member forming part of the bevel-pinion 19 I provide the bell-crank 22, one arm of which engages with the clutch member 21, while the other arm thereof is acted upon by the side cam 23 on the cam-hub 24, the latter being mounted on the shaft 25, which is driven from the shaft 2 by means of the spur-gears and pinions 26.

27 is a bevel-gear fast on the shaft 25 and engaging with the bevel-pinion 19 for the purpose of rotating the latter. Through the cam 23 and bell-crank 22 the clutch member 21 is actuated to determine the times at which the said clutch member shall be engaged with the clutch member forming part of bevel-pinion 19, thus determining when clamp 12 shall be rotated during the working of the machine. The upper clamp 13 is fast on the lower end of a short shaft 28, the latter being free to rotate and also to slide vertically in bearings 29 29, which are provided therefor in the machine-framing, the upper end of the said shaft 28 having a flanged head 30 applied thereto.

31 is a coupling having the body thereof applied to the upper surface of the head 30, antifriction-balls 321 being interposed between the two, the said coupling having side arms 311 311, carrying pins 312 312, which extend beneath and engage with the under surface of the flange of the head 30.

32 is a lever to one end of which the coupling 31 is pivotally connected, the said lever having connected to the other end thereof the rod 33, the said rod carrying at its lower end a pin or roller 34, working in the groove of the cam 35, the latter being mounted on the shaft 25. Through the medium of the devices described the upper clamp 13 is moved toward and from the lower clamp 12. As will be obvious, the clamp 13 is free to rotate in unison with the clamp 12 after having been pressed down tightly on the boards which intervene between the two. In order to enable the upper clamp 13 to adjust itself to the greater or less thickness of the boards which are introduced between the clamps, I provide for yielding of the connections intermediate the cam 35 and the said clamp 13. Preferably I interpose a spring 36 between the upper end of the rod 33 and the coupling-piece 331, which latter is pivoted to the outer end of the lever 32, the upper end of the rod 33 being headed or flanged and entering the socket which is formed in the coupling-piece 331, the said rod passing through a tubular screw 332, which is fitted to the mouth of the said coupling-piece 331.

As will be understood, a barrel-head is commonly composed of a series of boards or pieces placed edge to edge. When a suitable number of pieces of board is lying side by side upon the upper surface of the feed-table, the edges thereof usually are more or less apart, and they separate more or less as the pieces of board are pushed forward between the clamps.

I provide as follows for preventing undue separation of the boards as they are being fed forward and for forcing the pieces of board closely together while located between the clamps, these devices acting to compress the edges of the boards together and hold them firmly in that position until they have been grasped between the clamps by the descent of the upper clamp 13. Thus at 37 is a swinging compressor which is mounted upon the shaft 38 at one side of the machine, the said shaft having thereon an arm 39, which is joined by the link 40 to the arm 41 of a rock-shaft 42, the latter having at its opposite end an arm 43, which is joined by a link 44 to one arm of the bell-crank 45, the other arm of which latter is operatively connected with a rod 46, the lower end of the said rod 46 being connected with one arm 47 of a rock-shaft 48, the latter having a second arm 49, carrying a pin or roller which engages in the groove of a cam 50, which is fast on the shaft 25. By means of the said cam the compressor 37 is moved from the full-line position in Fig. 1, which is the fully-retracted position thereof, and is occupied thereby during the rotation of the clamps and the trimming or cutting of a barrel-head, successively into the two dotted-line positions in Fig. 1, which latter are designated 1 and 2, respectively. The dotted-line position designated 1 is that which the said compressor 37 is caused to occupy during the advancing movement of the boards, the compressor serving while in such position as a side guide to prevent the boards from spreading or diverging laterally too far while moving into position between the clamps. The dotted-line position of the compressor 37 which is designated 2 is that which is given to the said compressor in order to finally determine the position of the boards while located between the clamps, this movement being caused to take place after the assembled series of boards is in position between the clamps prior to the closing of the latter. At the opposite side of the clamps there is provided a horizontally-sliding compressor 371, consisting of a bar having an upturned inner end, which is connected with the upper end of a lever 372, the latter being moved outward to retract the compressor 371 by means of a cam 373 on the shaft 25 and being returned by a spring 374, which latter acts to draw the compressor 371 inwardly with a yielding force toward the boards, the final portion of the inward movement of compressor 371 taking place as or after the compressor 37 completes its inward movement. The spring 374 allows the compressor 371 to adjust itself to variations in the widths of the assembled series of boards which are located between the clamps. The compressor 37 is of considerable breadth to adapt it to serve as a side guide for the boards; but the compressor 371 is narrow and engages with the outer edge of one of the boards at or near mid-length thereof. This enables the boards to adjust themselves into proper position, closely together, edge to edge, as they are compressed by compressor 371 toward compressor 37 regardless of any taper that there may be in the width of one or more of the boards.

The cutter-shaft 51 is mounted in an inclined position beneath the clamps. It is provided with a band-pulley 52, around which latter in practice is passed a suitable driving-band, the latter not being shown. The said cutter-shaft is fitted to bearings within an inclined elongated sleeve-like frame 53, (see Fig. 6,) the latter being rectangular exteriorly in cross-section, and collars 531 531 being secured on the cutter-shaft at the opposite ends of the said frame 53 to prevent endwise movement of the cutter-shaft and frame relatively to each other.

At 60 60, Fig. 9, are brackets projecting from the upper end of the pillar 14 and between which brackets the frame 53 is fitted and adapted to move vertically. The frame 53 is fitted to slide through box 532, (see Fig. 7,) which latter is journaled between the arms of a bracket 533, (see Fig. 8,) which is secured to the pillar 14. To a lug depending from the frame 53 is pivoted a connection or coupling-piece 54, and a similar connection or coupling-piece 54 is pivoted to the horizontally-extending arm 56 of a rock-shaft 57, the said rock-shaft having an arm 58, which is provided with a pin or roller working in the cam-groove 59 of the cam-hub 24. The connections or coupling-pieces 54 54 are united by means of a right-and-left screw 55.

The foregoing construction and devices provide for swinging movements of the cutter-shaft and cutters in a vertical plane. The cutters are mounted on the upper end of the inclined cutter-shaft. In operation the said cutters are swung up into position to engage with the material which is held between the clamps and afterward are swung down into the position in which they are represented in Fig. 1.

64 is the cutter by means of which the boards are trimmed into circular form. This cutter is made as a circular saw, and in order that it may work properly in connection with the material and without binding therein it is dished somewhat—that is to say, is shaped like a segment of the shell of a hollow sphere. This compensates for the circular movement of the material while being cut and also for the vertical swinging movement which is communicated to the cutter. Immediately adjacent to the cutter 64 I apply the cutter 65, which latter bevels off the lower portion of the edge of the boards, the combined action of the cutters 64 and 65 producing an edge that is shaped as indicated in the drawings.

66 designates a barrel-head in position on the lower clamp 12, it being shown in its completed form.

I claim as my invention—

1. The combination with a cutter, clamps, means to operate said cutter and clamps, and a feed-table leaving an opening at the feed side of the said clamps and having slideways at opposite sides thereof terminating at the feed side of the clamp, of endless chains or carriers, guides or carrier-wheels for said endless chains or carriers arranged to change the course or direction of the latter at points adjacent to the clamps, and a gravitating or unbalanced feed-bar pivotally connected to said chains or carriers and having foot portions to rest on said slideways whereby to hold it during the movement of said feet along the slideways in position to engage an assembled series of boards on the feed-table and push them forward to the clamps, the said feed-bar dropping or gravitating away from the said boards on arriving at the forward ends of the slideways at the feed side of the clamps, substantially as described.

2. The combination with a cutter, rotary clamps, a feeding device to introduce an assembled series of boards between the said clamps, and means to operate the said cutter, clamps, and feeding device, of compressors at opposite sides of the said clamps, and means to actuate the said compressors to compact the boards together edgewise prior to the closing of the clamps upon the same, and to retract the compressors from proximity to said boards to clear the latter in the rotation of the boards and clamps, substantially as described.

3. The combination with a cutter, clamps, a feeding device to introduce an assembled series of boards between the said clamps, and means to operate the said cutter, clamps, and feeding device, of compressors at opposite sides of the said clamps, and means to operate the said compressors constructed substantially as described to advance one of the compressors into an intermediate position to serve as a side guide for the advancing series of boards as the latter pass between the clamps, and then to completely advance the compressors to cause them to coact in compacting the boards together prior to the closing of the clamps upon the same, substantially as described.

4. The combination with a rotary cutter, rotary clamps, a feeding device to introduce an assembled series of boards between the said clamps, and means to operate the said cutter, clamps, and feeding device, of the compressors, 37, 371, at opposite sides of the said clamps, means to move compressor 37 inwardly at the required time with positive force, and to move compressor 371 inwardly at the required time with yielding force, and then to retract the compressors from proximity to said boards to clear the latter in the rotation of the boards and clamps, substantially as described.

5. The combination with a rotary cutter, rotary clamps to receive and hold the series of boards of which a barrel-head or the like is to be formed, and means to operate the said cutter and clamps, of the broad compressor 37 at one side of the said clamps, the narrow compressor at the other side thereof, a feeding device to introduce an assembled series of boards between said clamps, and automatic means to operate the said feeding device and cause the said compressors to force the said series of boards together edgewise, and then to retract the compressors from proximity to said boards to clear the latter in the rotation of the boards and clamps, substantially as described.

6. The combination with the rotary clamps, of the inclined cutter-shaft, the cutter on said shaft to trim the material between the clamps into circular form, the frame 53 in which the said cutter-shaft has bearings, the pivoted box to which the said frame is fitted, a connecting-rod variable or adjustable in length and connected to the said frame 53, arms 56, 58, rock-shaft 57, and a cam engaging the arm 58, substantially as described.

In testimony whereof I affix my signature in presence of two witnesses.

JAMES H. REED.

Witnesses:
CHAS. F. RANDALL,
WILLIAM A. COPELAND.